United States Patent
Wang et al.

(10) Patent No.: US 9,223,797 B2
(45) Date of Patent: Dec. 29, 2015

(54) REPARSE POINT REPLICATION

(75) Inventors: Xiaopin Wang, Beijing (CN); Ran Shuai, Beijing (CN); Shisheng Liu, Beijing (CN); Alexey Shvechkov, Natick, MA (US)

(73) Assignee: CA, INC., New York, NY (US)

( * ) Notice: Subject to any disclaimer, the term of this patent is extended or adjusted under 35 U.S.C. 154(b) by 568 days.

(21) Appl. No.: 13/446,534

(22) Filed: Apr. 13, 2012

(65) Prior Publication Data

US 2013/0275541 A1    Oct. 17, 2013

(51) Int. Cl.
  *G06F 15/16*  (2006.01)
  *G06F 17/30*  (2006.01)
  *G06F 11/14*  (2006.01)

(52) U.S. Cl.
  CPC ...... *G06F 17/30215* (2013.01); *G06F 11/1453* (2013.01); *G06F 11/1458* (2013.01); *G06F 17/30221* (2013.01)

(58) Field of Classification Search
  CPC .......................... G06F 15/16; H04L 29/08072
  USPC .......................................................... 709/208
  See application file for complete search history.

(56) References Cited

U.S. PATENT DOCUMENTS

2010/0293147 A1*  11/2010  Snow et al. ................... 707/640
2011/0289058 A1*  11/2011  Anzai et al. ................... 707/650

* cited by examiner

*Primary Examiner* — Shripal Khajuria
(74) *Attorney, Agent, or Firm* — Pillsbury Winthrop Shaw Pittman LLP

(57) ABSTRACT

Systems and methods for replicating data from a master server to a replica or backup server include capturing a read event associated with a retrieved file at the master server. The retrieved file may be generated by updating a reference file with remotely stored data. Attributes associated with the retrieved file may be checked to determine if they include attributes associated with the reference file, and if they do not, at least a portion of data and one or more attributes of the retrieved file may be copied or replicated to the replica server. The captured read event may be generated when an application attempts to access or read the retrieved file. An event associated with generation of the reference file may also be captured at the master server, and copies to the replica server.

21 Claims, 2 Drawing Sheets

REPARSE POINT REPLICATION

FIELD OF THE INVENTION

The invention generally relates to data backup and recovery, and more particularly to backup and replication of files related to reparse points.

BACKGROUND OF THE INVENTION

In some file systems, such as New Technology File System (NTFS) supported under Microsoft's Windows™ operating systems, a feature called "reparse points" is provided, which may permit storage of infrequently used or accessed data of a file in a long-term storage (such as tape or optical media), and replacing the file with another file including information relating the location of the migrated data. A number of different types of reparse points may be supported natively by the file system, and it may also be possible for applications to generate new types of reparse points to support application-specific features. For example, in environments that employ a hierarchical storage management (HSM) system, files that have not been accessed for a long time may be moved to a long-term storage, and a reparse point may be associated with the file name. If an access to the file is then attempted, the file system may examine the reparse point to look up the actual location of the file within the hierarchical file system, and retrieve the file contents from that location in the long-term storage.

Traditional data backup or replication techniques, such as making exact replicas of files and/or directories, may not work well for performing replication of files including reparse points or files having data that are retrieved based on reparse points. For example, if an HSM system has placed the contents of a file in a long-term storage, and associated a reparse point with the file name, and a conventional replication application accesses the file for copying, complete contents, of the file may be first retrieved from the long-term storage, and then the retrieved file may be copied to a replica or backup server. Such a retrieval (before replication) may significantly delay replication, especially for large files, and in some cases users may not even have intended to backup files that have already been archived. Furthermore, the replica server may not be configured to support HSM. In other words, the replication process involving complete retrieval and copying of data related to reparse points may be very slow and data-traffic intensive, thereby negatively impacting the performance of the replication system.

Thus, to address the above-discussed problems, it is desirable to develop and provide an improved replication process for reparse points that may be implemented on wide range of operating systems without introducing unnecessary delay in the replication process.

SUMMARY

In some implementations, the invention provides systems and methods for data replication related to creation or retrieval of a reparse point file. The data replication may occur from a master server (e.g., a production server) storing the reparse point file to a replica server (e.g., a backup server). In general, systems and methods described herein provide mechanisms that relate to operations performed, e.g., by a replication module at the master server including capturing particular events related to the reparse point file (or a "reference file") or other files associated with the reparse point file, and based on said event capturing, performing data replication.

A system for data replication described herein may include a master application, which may reside in or otherwise be operatively associated with the master server. The master application may be or include a computer application (or plurality of applications capable of communicating with one another) having one or more modules thereon, which when executed, perform data replication from a master server to a replica server.

In some implementations, the one or more modules may include instructions causing one or more processors to capture a read event associated with a retrieved file, e.g., an event generated by an application at the master server to access and read the retrieved file. The retrieved file may be generated by updating a reference file with stored data, e.g., data stored in a secondary storage device external to a primary storage of the master server. In some implementations, to generate the retrieved file, the one or more processors are further configured to copy the stored data to the reference file, remove one or more of the attributes of the reference file, and replace the reference file with the retrieved file at the master server.

Further, in some implementations, the processors are configured to determine whether attributes associated with the retrieved file include attributes associated with the reference file, and based on a determination that the attributes associated with the retrieved file do not include the attributes associated with the reference file, copy at least a portion of data of the retrieved file to a replica server. One or more of the attributes of the retrieved file may also be replicated to the replica server.

In some implementations, the reference file may be generated and stored at the master server by copying at least a portion of data of an original file in a primary storage of the master server to a secondary storage device external to the primary storage. At least a portion of the data of the original file may include the stored data used to generate the retrieved file. The original file may then be replaced with the reference file at the master server, and the reference file may include a reparse point at least having data identifying a storage location at the secondary storage device of the stored data or the at least portion of the original file data.

In some implementations, the one or more processors are further configured to replicate the reference file to the replica server by capturing an event associated with the generation of the reference file, and copy the captured event associated with the generation of the reference file to the replica server.

In some implementations, the invention provides a method for data replication related to creation or retrieval of a reparse point file from a master server to a replica server. The method may include capturing, using a processor operatively associated with a master server, a read event associated with a retrieved file. The retrieved file may be generated by updating a reference file with stored data. The method may further include determining whether attributes associated with the retrieved file include attributes associated with the reference file, and if the retrieved file do not include the attributes associated with the reference file, copying at least a portion of data of the retrieved file to a replica server. In some implementations, the method may also include capturing an event associated with generation of the reference file, wherein the reference file is generated based on an original file at the master server, and wherein data of the original file includes the stored data used for generating the retrieved file. The reference file may include a reparse point at least having data identifying a storage location at a secondary storage device (e.g., external to the master server) of the stored data or the original file data. The captured event associated with the generation of the reference file may be copied to the replica server, based on which a replica of the reference file may be generated at the replica server.

In some implementations, the invention may include a tangible computer readable storage media having computer or processor-executable instructions thereon, that when executed by one or more processing devices, may configure the one or more processing devices to perform one or more of the features and functions described herein.

These and other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION OF THE INVENTION

Figure 1:
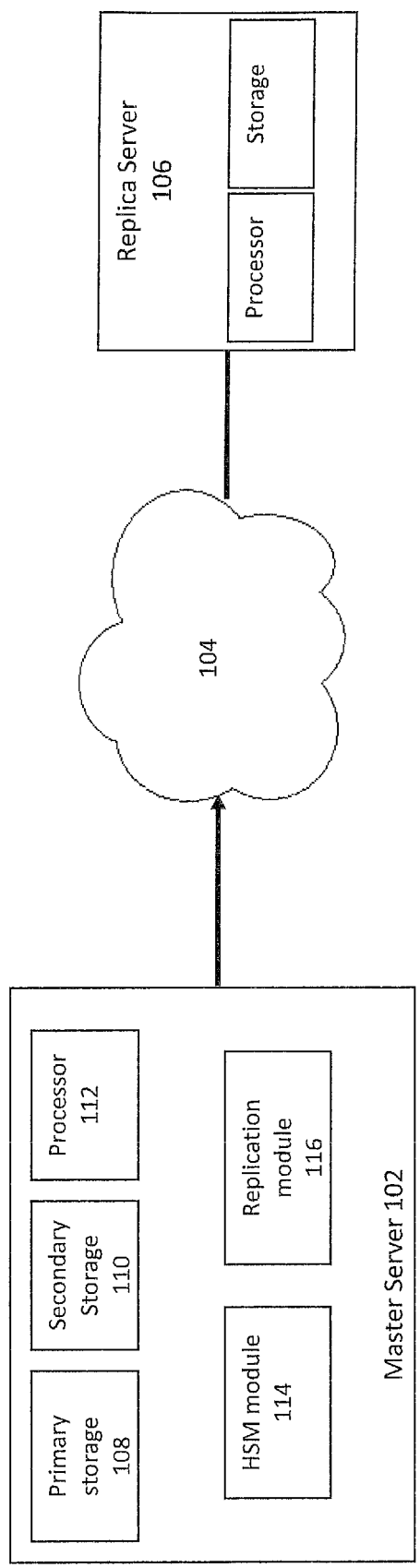
FIG. 1 illustrates an example of an environment that includes a system for performing data replication, according to various implementations of the invention.

In some implementations, the invention provides systems and methods for data replication related to a reparse point file or a file including data retrieved using the reparse point file. In general, a reparse point may be implemented as an application-generated data structure associated with a file or a directory. The data structure may, in some implementations, include two fields: a type field or "tag" indicating the specific function for which the reparse point is to be used by the application (e.g., hierarchical storage management (HSM), volume mount, etc.), and a data field or "data packet" that includes application-specific data, such as state information, access methods to use to obtain the underlying data, etc. The format of this data is understood by the application that stores the data and a file system filter, which is installed to interpret the data and process the file. When an application sets a reparse point, it stores this data and a reparse tag, which uniquely identifies the data it is storing. When the file system opens a file with a reparse point, it attempts to find the file system filter associated with the data format identified by the reparse tag. If a file system filter is found, the filter processes the file as directed by the reparse data. If a file system filter is not found, the file open operation fails. For example, reparse points are used to implement NTFS file system links and the Microsoft Remote Storage Server (RSS). RSS uses an administrator-defined set of rules to move infrequently used files to long-term storage, such as tape or optical media. RSS uses reparse points to store information about the file in the file system. This information is stored in a stub file that contains a reparse point whose data points to the device where the actual file is located. The file system filter can use this information to retrieve the file.

For example, when the file system (e.g., NTFS) is about to open a stub file (or a folder) with an associated reparse point, it reads the unique reparse point tag name and passes the raw data of the data packet to a file system filter driver registered to process that tag. The file system filter driver then performs the application-appropriate actions. The file system filter driver may be a layer of software on top of a file system driver within a storage software stack. The file system filter driver may be configured to intercept operations to be performed on storage objects as the operations are passed down the stack (or as operation results are passed up the stack), and to perform any of a variety of operations (e.g., redirect read/write requests, leave data or I/O requests unchanged, perform extra tasks such as establishing contact with a hierarchical storage manager or a single instance store manager, etc.) on the intercepted operations or operation results.

In addition to Microsoft RSS reparse point discussed above, HSM, volume mounting, directory junctions and single instance store (SIS) reparse points may be defined and used for a variety of other purposes by various applications in different implementations. For example, a file may not have been accessed for a period of time, and an HSM system (e.g., as implemented as part of Symantec Enterprise Vault product) may move at least a portion of the file data from a primary storage (where the file is originally stored) to a secondary or archival storage. The HSM system may then generate a file containing a reparse point (RP) associated with the original file, and replace the original file with the reparse point at the master server. This reparse point may include a type field or tag indicating that the data has been migrated by an HSM system, and a data field or packet identifying, for example, the HSM used for migration, a location of the contents of the original file within the secondary storage, configuration information indicating the set of operations to be performed to retrieve the data, state information such as when the data was migrated, and other information. When the original file is accessed by a user at a master server, the file system filter driver may be configured to use the data packet of the reparse point to activate the HSM and retrieve the migrated data to re-generate the complete contents of the original file for the user.

In some implementations, a volume mount point reparse point may be associated with a directory at the master server, when a CD-ROM drive is mounted on, or made accessible from, that directory. When an application or a user accesses the directory at the master server, the file system and/or volume manager may be configured to use a tag or type field of the volume mount point reparse point to determine that a removable media drive has been mounted on the directory, and to use the data packet or field of that reparse point to identify the specific CD-ROM drive, the commands to be used to access or "open" a CD-ROM that may have been inserted into the drive, and other information. Further, a directory junction reparse point associated with a directory of the master server may include a tag that indicates that the corresponding directory represents an alternate path, soft link, or alias to another directory, and a data packet that identifies the other directory. Thus, when a user accesses the directory associated with the reparse point, and requests a listing or display of its contents, the contents of the underlying directory may be listed or shown. A single instance store (SIS) reparse point, associated with a file at the master server, may include within its data packet an identification of a single instance store where shared contents of the file (i.e., data of the file that may be common to one or more other files and may therefore be stored in a shared location to reduce overall storage utilization) are stored. The tag of such an SIS reparse point such may be generated by an SIS application to identify the file as a participant in SIS, and the data packet may be used to retrieve the portions of the file from the SIS when that portion of the file is accessed.

FIG. 1 illustrates an example of an environment 100 in which a system for performing data replication related to generation and retrieval of reparse points resides. As depicted in FIG. 1, environment 100 includes a system for replicating data from a master server (e.g., a production server) to a replica server (e.g., a backup server). The system in the environment 100 may include a master server 102 communicatively coupled, via a network 104, to a replica server 106. Although only one master server 102 and replica server 106 is shown in FIG. 1, this is for illustrative purposes only. In some implementations, there may be a plurality of master servers 102 and/or a plurality of replica servers 106 connected via one or more networks 104 or otherwise connected to one another. Master server 102 may store data objects to be backed-up or replicated (e.g., periodically, on-demand or in response to a change detected in a data object) to ensure that critical applications and data are available during outages. Outages may be planned (e.g., system maintenance), or unplanned (e.g., human error, viruses and other malware and natural disasters). Data objects considered for replication (i.e., replicated or protected data) may include or may be associated with data items operated on or updated by one or more components or functions of master server 102. Such data items may include data files, file systems, directories (or folders), logical volumes, database entities, or other data items stored in a storage of master server 102.

Replica server 106 may be acting as a backup server to the master server 102. After an initial backup and replication (i.e., synchronization) of data items to be protected, further operations on the data items may be recorded as events, which may be consolidated and sent to replica server 106. The recorded events may be consolidated at master server 102, for example, using techniques described in U.S. patent application Ser. No. 12/775,066, entitled "Thurnal Event Consolidation," which is incorporated by reference herein in its entirety. In some implementations, the operations or events are recorded at master server 102 without recording the data associated with the operations (i.e., changes to the data items). However, data blocks or files affected by the operations may be identified at master server 102, and the identified data blocks may be processed to generate representative data blocks, which may be sent to replica server 106 along with or after sending the consolidated event(s). This mechanism of using representative data blocks (that represent the modified or affected data blocks) in conjunction with the consolidated events to replicate data or update replicated data may reduce data redundancy in the replication process. As such, replication and recovery speed may be increased, and CPU usage and network overhead may be reduced. Other replication techniques may be implemented.

Network 104 may include the Internet and/or other networks. It will be appreciated that this is not intended to be limiting, and that the scope of this disclosure includes implementations in which the master server 102 and the replica servers 106 are operatively linked via some other communication methodology, e.g., via a direct wired or wireless connection. In some implementations, environment 100 may include one or more elements other than master server 102 and replica server 106 (not shown). These other elements may include one or more servers, desktops, laptops, workstations, wireless devices (e.g., smartphones, personal digital assistants, etc.), routers, switches, and/or other network or other devices.

In some implementations, master server 102 may include a primary storage 108, and a secondary storage 110 and/or other elements. Although secondary storage 110 (collectively referred to as the "storage units") is depicted as part of and implemented within master server 102, secondary storage 110 may be external to, but operatively associated with, master server 102. One or more storage units 108, 110 may comprise electronic storage media that electronically stores information. Such electronic storage media may be provided integrally (i.e., substantially non-removable) to master server 102 and/or as removable storage that is removably connectable to master server 102 via, for example, a port (e.g., a USB port, a firewire port, etc.) or a drive (e.g., a disk drive, etc.). Storage units 108, 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Primary storage 108 may store the "protected" data objects or items (e.g., files and/or directories to be backed-up), files containing reparse points associated with one or more of the original protected data objects, software algorithms, and/or other information that enables master server 102 to function as described herein. Secondary storage 110 may store data of the original data objects that were moved by an HSM system associated with master server 102. Location of data of each original data object in secondary storage 110 is indicated by a corresponding reparse point stored in primary storage 108.

In some implementations, master server 102 may include a processor 112 may be configured to provide information processing capabilities in master server 102. As such, processor 112 may include one or more of a digital processor, an analog processor, a digital circuit designed to process information, an analog circuit designed to process information, a state machine, and/or other mechanisms for electronically processing information. Although processor 112 is shown in FIG. 1 as a single entity, this is for illustrative purposes only. In some implementations, processor 112 may include a plurality of processing units. These processing units may be physically located within the same device or computing platform, or processor 112 may represent processing functionality of a plurality of devices operating in coordination.

In some implementations, replica server 106 may act as a backup server to master server 102 and may include a storage, a processor, and other elements. The storage units at replica server 106 may be similar to or different than the storage units (e.g., storage units 108, 110) of master server 102. Replica server 106 may further include various components (not depicted in FIG. 1) such as user interfaces, processors, and so forth. Components similar to one or more of the components described above with respect to master server 102 (e.g., storage units 108, 110, and processor 112) may be part of replica server 106. Such components may be used for the same or different functions as described above for master server 102.

In some implementations, master server 102 further includes an HSM module 114, and a replication module 116. In some implementations, modules 114, 116 may include computer executable instructions embodied on computer readable storage media, e.g., primary storage 108. These computer executable instructions may be used to configure processor 112 of master server 102 for performing one or more features and functions, including those disclosed herein and/or other features and functions. In some implementations, modules 114, 116 may be implemented across multiple applications (e.g., module 114 as part of Symantec Enterprise Vault application, and module 116 as part of Computer Associates ARCserve application), and/or devices within environment 100 to perform the data replication features and functions described herein.

In some implementations, HSM module 114 may be configured to move at least a portion of data of an original file stored in primary storage 108, e.g., which has not been accessed or read for a (predetermined) period of time, to secondary storage 110. HSM module 114 may be further configured to generate a file containing a reparse point (RP) (termed hereinafter as "RP file") associated with the original file, and replace the original file in storage 108 with the RP file. The reparse point in the RP file may include a tag indicating that the data has been migrated by a HSM system, and data identifying HSM module 114, a location within secondary storage 110 of the contents of the original file that have been moved by HSM module 114, configuration information indicating the set of operations to be performed to retrieve the data from secondary storage 110, state information such as when the data was migrated, and other information.

When a user or application attempts to access the original file, a HSM mini-filter driver of HSM module 114 will be notified of the access request, e.g., by a file system driver (FSD) of master server 102. Based on the information provided in the corresponding reparse point, the HSM mini-filter driver may be configured to generate a retrieved file corresponding to the requested original file, e.g., by retrieving data (i.e., the migrated data of the original file) from secondary storage 110, and writing the retrieved data into a temporary or "tempt" file created at master server 102 (and stored in primary storage 108). The tempt file may include a "delete on close" flag. To generate the retrieved file, the HSM mini-filter driver may be further configured to copy the contents of the tempt file to the corresponding RP file, and set or update attributes of the RP file, such that the current attributes of RP file (indicating that it is a file containing a reparse point) are removed. In some implementations, the attributes associated with the RP file that may be removed include FILE_ATTRIBUTE_REPARSE_POINT and FILE_ATTRIBUTE_OFFLINE.

In some implementations, replication module 116 may be configured to replicate or back-up data items at primary storage 108 to replica server 106 including, but not limited to, RP files and retrieved files generated based on RP files (by HSM module 114). To perform replication operations, replication module 116 may include one or more components, modules, or application described in detail in U.S. patent application Ser. No. 12/955,299, entitled "Periodic Data Replication," and U.S. patent application Ser. No. 13/018,934, entitled "Block Level Data Replication," contents of each of which are incorporated by reference herein in their entirety. For example, replication module 116 may include, among other components, one or more of a snapshot module, a synchronization module, a file system driver (FSD) module, and a change manager—functions and configurations of each of which are described in detail in the aforementioned patent applications.

In some implementations, master server 102 is configured to synchronize one or more RP files generated by HSM module 114 and stored in primary storage 108 with replica server 106. For example, to synchronize one or more RP files, master server 102 may utilize the synchronization module of replication module 116, which may detect whether a file includes reparse point by inspecting attributes of the RP file (e.g., FILE_ATTRIBUTE_REPARSE_POINT and FILE_ATTRIBUTE_OFFLINE attributes). In some implementations, attributes of a file are obtained using a getFileAttribute( ) or getFileAttributes( ) call. If the file is determined to include a reparse point, to synchronize the file, replication module 116 (or the synchronize module thereof) invokes one or more system calls including DeviceIOControl( ) call with FSCTL_GET_REPARSE_POINT control code to read the contents of the RP file, serialize the contents of the RP file to an item of a job file containing various operations, and send the job file to replica server 106. To complete the synchronization of the RP file, replica server 106 may, first, unserialize the contents of the RP file from the item of the received job file, create or set the reparse point by invoking DeviceIOControl( ) call with FSCTL_SET_REPARSE_POINT control code, and add the contents of the RP file to the created reparse point.

As discussed above, HSM module 114 moves content of a file to secondary storage 110 (e.g., in accordance with instructions from a user or application), and replaces that file with a RP file (including a reparse point). As part of the RP file generation process, system calls such as DeviceIOControl( ) call with FSCTL_SET_REPARSE_POINT may be invoked (e.g., by replication module 116) by an I/O manager at master server 102. Accordingly, to replicate the generated RP file, replication module 116 may be configured to capture IRP_MJ_FILE_SYSTEM_CONTROL request, e.g., sent by the I/O manager of master server 102, and contents of the RP file, and those captured contents to replica server 106. At replica server 106, the RP file is replicated by invoking DeviceIOControl( ) call with FSCTL_SET_REPARSE_POINT control code, and add the contents of the RP file to the created reparse point.

With regard to the retrieval of data of an original file using a corresponding RP file, as discussed above, HSM module 114 copies the data indicated by the reparse point from secondary storage 110 to a tempt file in primary storage 108. Further, HSM module 114 copies the contents of the tempt file to the corresponding RP file, and set or update attributes of the RP file, such that the current attributes of the RP file are removed. However, system calls or events related to these data copy and set attribute I/O operations may not be visible to or capturable by replication module 116. This may be because the "altitude" of a HSM mini-filter category (related to HSM module 114) is lower than that of replication mini-filter category (related to replication module 116), and some HSM mini-filters may issue I/O operations directly to lower altitude filters. A file system mini-filter driver (e.g., I-ISM mini-filter or replication mini-filter driver) developed to the Filter Manager model has a unique identifier called an altitude that defines its position relative to other mini-filters in the I/O stack. Mini-filter altitudes are allocated by Microsoft based on mini-filter requirements and load order group. In other words, because the HSM mini-filter driver is attached below the replication mini-filter driver in the I/O stack, the replication mini-filter driver is unable to capture these I/O operations related to generation of a retrieved file from a corresponding RP file. As such, replication module 116 may not be able to determine when a RP file is updated with stored data and becomes a "regular" file with original data, e.g., that may be read by a user or an application at master server 102.

Accordingly, in some implementations, to replicate changes performed to a RP file in relation to retrieval of stored data, replication module 116 is configured to monitor the attributes of the RP file. If replication module 116 determines that the reparse point-related attributes from the RP file are removed (e.g., by HSM module 114, as discussed above), indicating that the RP file has been updated as a regular retrieved file with original data, replication module 114 may copy at least a portion of the contents of the retrieved file to generate corresponding "write" events for replication. Replication module 116 may further generate a "set attribute" event to copy one or more current attributes of the retrieved file to replica server 106. The time point when replication module 116 may detect whether the attributes of the RP file are changed may occur when an application or a user attempts to access or read the RP file or the retrieved file, and the associated "read" event is captured by replication module 116.

Figure 2:
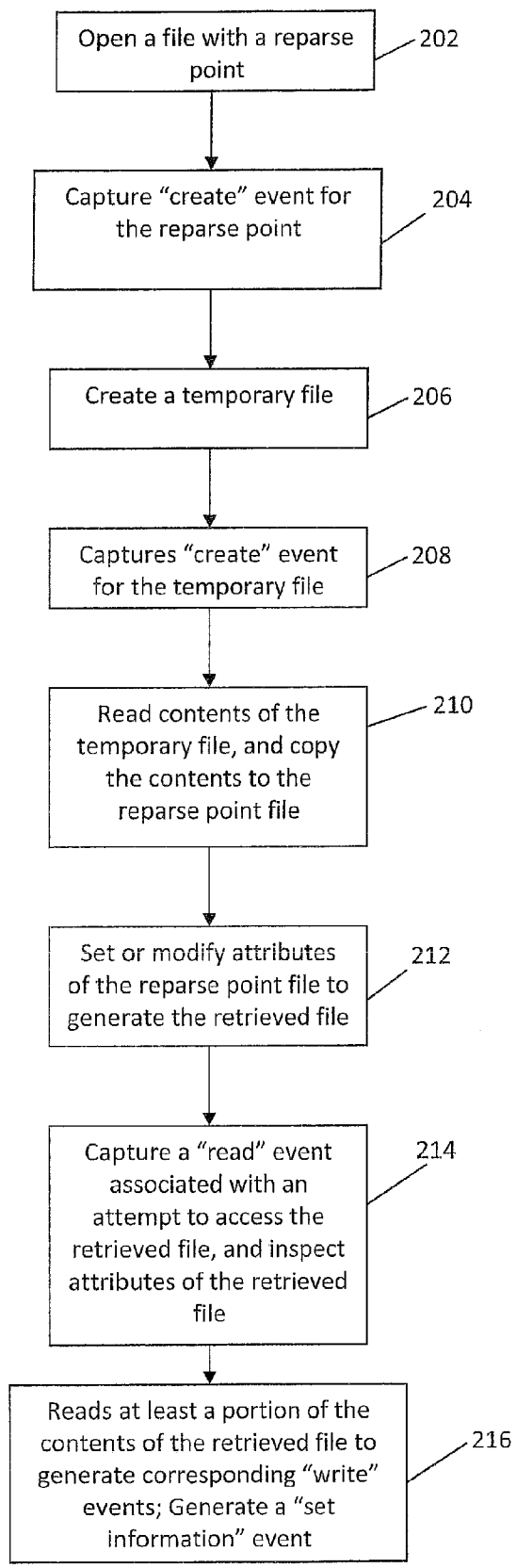
FIG. 2 illustrates an example of a method for data replication, according to various implementations of the invention.

In some implementations, the invention provides a method for data replication in response to change in files including reparse points, e.g., upon data retrieval by HSM module 114. FIG. 2 illustrates a process 200, which is an example of a process for data replication from master server 102 to replica server 106, in response to a RP file being updated with data stored in secondary storage 110 (and thus, converted back to a regular file). In some implementations, process 200 may be performed by one or more processors (e.g., processor 112) configured by computer executable instructions for performing a plurality of operations (e.g., the operations of process 200).

Process 200 includes an operation 202, wherein a user or an application at master server 102 attempts to open a RP file, e.g., a text file "t.txt" including a reparse point. In operation 204, replication module 116 captures a "create" event for the reparse point. In the pre or post create callback, replication module 116 may query the information of the file to identify whether it was created by HSM module 114, and record the information in the stream context.

In operation 206, HSM module 114 creates a tempt file (e.g., with extension ".tmp"). In some implementations, the tempt file may include a "delete on close" flag. In operation 208, replication module 116 captures the "create" event for the tempt file, however, upon determining that the tempt file includes the "delete on close" flag, replication module 116 does not capture "write," "close" or "remove" events related to the tempt file, and as such, ignores the tempt file for replication. Further, in operation 210, HSM module 114 reads the contents of the tempt file, and writes or copies the read contents to the RP file t.txt. In operation 212, HSM module 114 further sets attributes of the RP file t.txt, e.g., removes attributes FILE_ATTRIBUTE_REPARSE_POINT and FILE_ATTRIBUTE_OFFLINE from t.txt. As discussed above, replication module 116 being at a higher altitude in the I/O stack is unable to capture events related to data copying from the tempt file to the RP file as well as attribute removal operations. In operation 214, when a user or an application attempts to read retrieved content of the t.txt file (which now does not include a reparse point), replication module 116 captures the corresponding "read" event for the t.txt file, and further inspects the attributes of the retrieved t.txt file. Since the FILE_ATTRIBUTE_REPARSE_POINT and FILE_ATTRIBUTE_OFFLINE attributes are removed from t.txt file (in operation 212), in operation 216, replication module 116 reads at least a portion of the contents of the retrieved t.txt file to generate corresponding "write" events at master server 102 for replication to replica server 106. Further in operation 216, replication module 116 generates a "set information" event to copy one or more of the current attributes of the t.txt file to replica server 106.

It should be appreciated that although modules 114, 116 are illustrated in FIG. 1 as being co-located with a single processing unit, in implementations in which processor 112 includes multiple processing units, one or more of modules 114, 116 may be located remotely from the other modules. The description of the functionality provided by the different modules, i.e., modules 114, 116 described above is for illustrative purposes, and is not intended to be limiting, as any of modules 114, 116 may provide more or less functionality than is described. As another example, processor 112 may be configured to execute one or more additional modules that may perform some or all of the functionality attributed below to one of modules 114, 116. In some implementations, one or more components (e.g., components 108, 110, 112) and/or modules (e.g., 114, 116) of master server 102 may be distributed among multiple machines or may otherwise reside on one or more computing elements (e.g., servers or other machines) separate from but otherwise connected to master server 102.

Implementations of the invention may be made in hardware, firmware, software, or any suitable combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A data replication method, comprising:
   capturing, using a processor, comprising hardware, operatively associated with a master server, a read event associated with a retrieved file, wherein the retrieved file is generated by updating a reference file with stored data;
   determining, using the processor, whether an attribute associated with the retrieved file comprises an attribute associated with the reference file; and
   responsive to a determination that the attribute associated with the retrieved file does not comprise the attribute associated with the reference file, transmitting, using the processor, at least a portion of data of the retrieved file to a replica server.

2. The method of claim 1, wherein the read event is generated in accordance with an attempt to access the retrieved file by an application at the master server.

3. The method of claim 1, wherein the stored data is stored in a secondary storage device external to a primary storage of the master server.

4. The method of claim 1, further comprising transmitting the attribute of the retrieved file to the replica server.

5. The method of claim 1, further comprising generating the reference file which generating comprises:
   transmitting at least a portion of data of an original file in a primary storage of the master server to a secondary storage device external to the primary storage, wherein the at least portion of the data comprises the stored data, and replacing the original file with the reference file at the master server, wherein the reference file comprises data identifying a location of the stored data.

6. The method of claim 1, further comprising:
capturing an event associated with generation of the reference file, wherein the reference file is generated based on an original file at the master server, wherein data of the original file comprises the stored data, and the reference file comprises data identifying a location of the stored data; and
transmitting the captured event associated with the generation of the reference file to the replica server.

7. The method of claim 1, further comprising generating the retrieved file which generating comprises:
copying the stored data to the reference file,
removing at least one attribute of the reference file, and
replacing the reference file with the retrieved file at the master server.

8. A system for data replication, the system comprising:
a processor, comprising hardware, configured to:
capture a read event associated with a retrieved file, wherein the retrieved file is generated by updating a reference file with stored data,
determine whether an attribute associated with the retrieved file comprises an attribute associated with the reference file, and
responsive to a determination that the attribute associated with the retrieved file does not comprise the attribute associated with the reference file, transmit at least a portion of data of the retrieved file to a replica server.

9. The system of claim 8, wherein the read event is generated in accordance with an attempt to access the retrieved file by an application at the master server.

10. The system of claim 8, wherein the stored data is stored in a secondary storage device external to a primary storage of the master server.

11. The system of claim 8, wherein the processor is further configured to transmit the attribute of the retrieved file to the replica server.

12. The system of claim 8, wherein the processor is further configured to generate the reference file, wherein, to generate the reference file, the processor is further configured to:
transmit at least a portion of data of an original file in a primary storage of the master server to a secondary storage device external to the primary storage, wherein the at least portion of the data comprises the stored data, and
replace the original file with the reference file at the master server, wherein the reference file comprises data identifying a location of the stored data.

13. The system of claim 8, wherein the processor is further configured to:
capture an event associated with generation of the reference file, wherein the reference file is generated based on an original file at the master server, wherein data of the original file comprises the stored data, and the reference file comprises data identifying a location of the stored data, and
transmit the captured event associated with the generation of the reference file to the replica server.

14. The system of claim 8, wherein the processor is further configured to generate the retrieved file, wherein, to generate the retrieved file, the processor is further configured to:
copy the stored data to the reference file,
remove at least one attribute of the reference file, and
replace the reference file with the retrieved file at the master server.

15. A non-transitory computer readable medium holding computer executable instructions thereon, the computer-executable instructions, when executed by a processing device, cause the processing device to perform a data replication method, the method comprising:
capturing a read event associated with a retrieved file, wherein the retrieved file is generated by updating a reference file with stored data;
determining whether an attribute associated with the retrieved file comprises an attribute associated with the reference file; and
responsive to a determination that the attribute associated with the retrieved file does not comprise the attribute associated with the reference file, transmitting at least a portion of data of the retrieved file to a replica server.

16. The medium of claim 15, wherein the read event is generated in accordance with an attempt to access the retrieved file by an application at the master server.

17. The medium of claim 15, wherein the stored data is stored in a secondary storage device external to a primary storage of the master server.

18. The medium of claim 15, wherein the method further comprises transmitting the attribute of the retrieved file to the replica server.

19. The medium of claim 15, wherein the method further comprises generating the reference file which generating comprises:
transmitting at least a portion of data of an original file in a primary storage of the master server to a secondary storage device external to the primary storage, wherein the at least portion of the data comprises the stored data, and
replacing the original file with the reference file at the master server, wherein the reference file comprises data identifying a location of the stored data.

20. The medium of claim 15, wherein the method further comprises:
capturing an event associated with generation of the reference file, wherein the reference file is generated based on an original file at the master server, wherein data of the original file comprises the stored data, and the reference file comprises data identifying a location of the stored data; and
transmitting the captured event associated with the generation of the reference file to the replica server.

21. The medium of claim 15, wherein the method further comprises generating the retrieved file which generating comprises:
copying the stored data to the reference file,
removing at least one attribute of the reference file, and
replacing the reference file with the retrieved file at the master server.

* * * * *